April 8, 1930.                C. W. HERZOG                1,753,784
                             TRANSMISSION GEAR
                         Filed Oct. 7, 1929     3 Sheets-Sheet 1
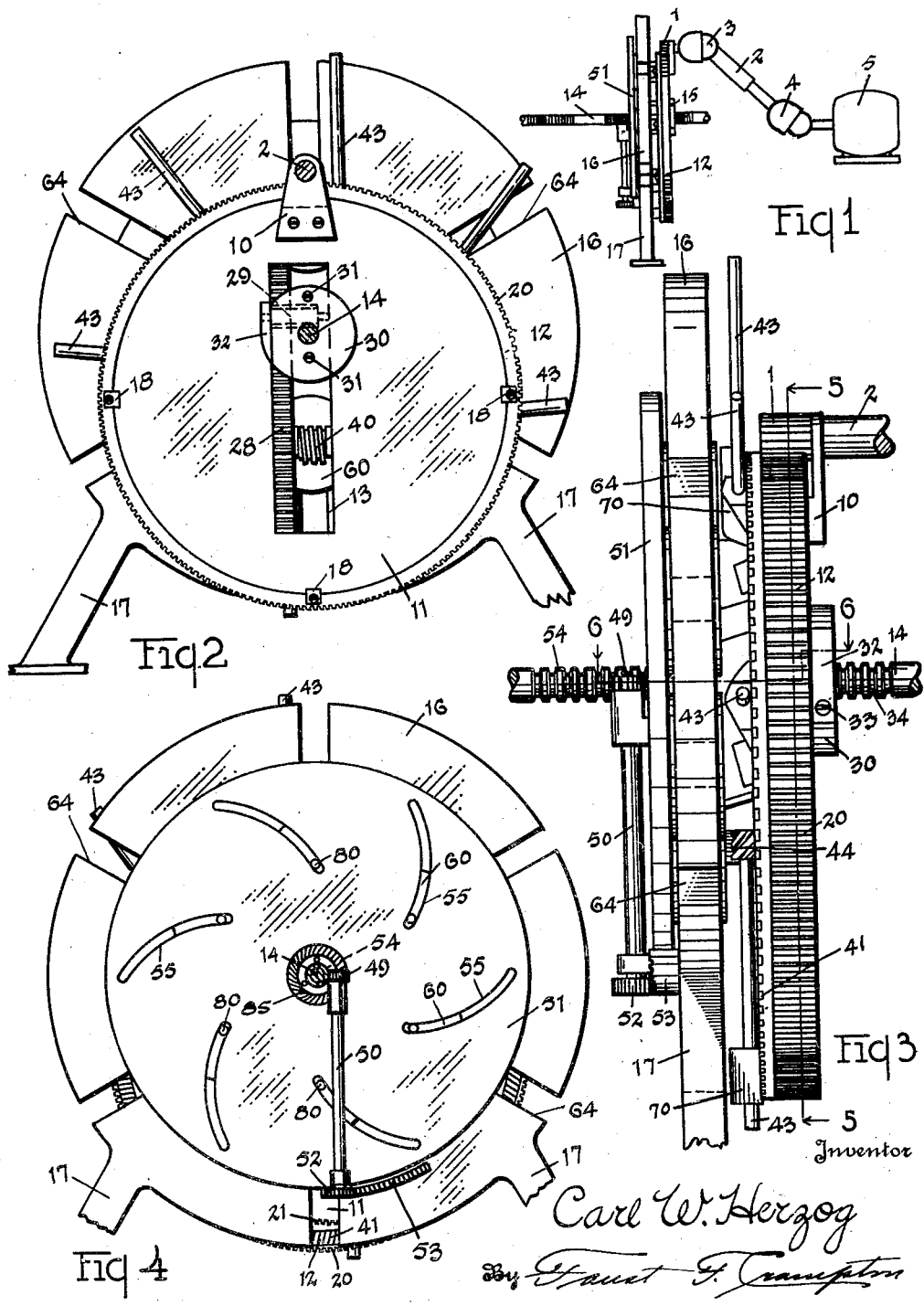
Inventor
Carl W. Herzog
Attorney April 8, 1930. C. W. HERZOG 1,753,784
TRANSMISSION GEAR
Filed Oct. 7, 1929  3 Sheets-Sheet 2
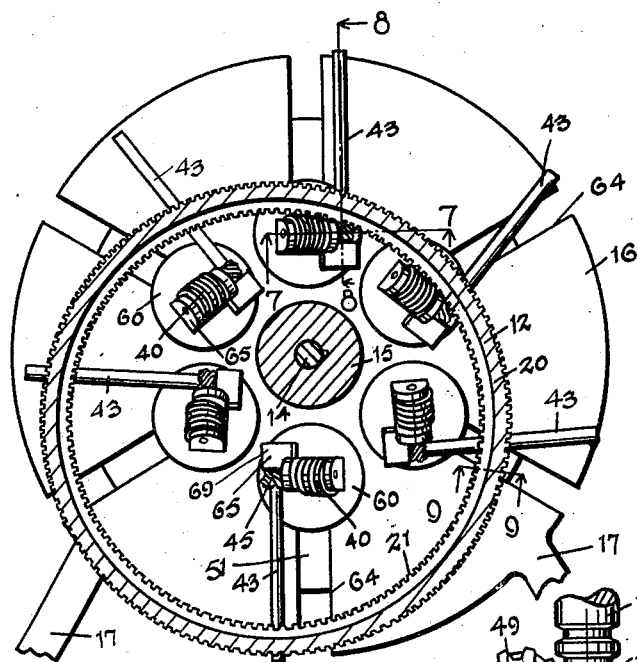
Fig 5
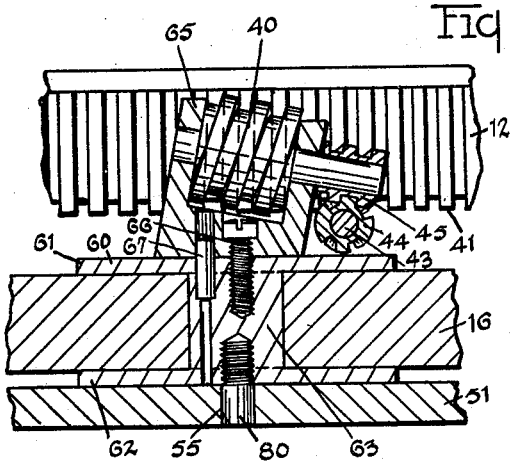
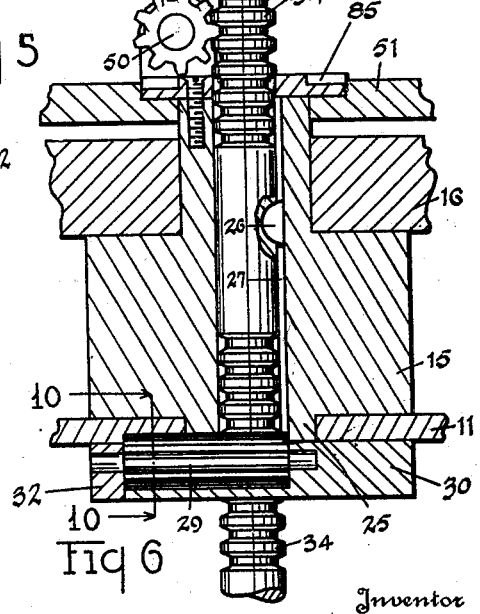
Fig 6
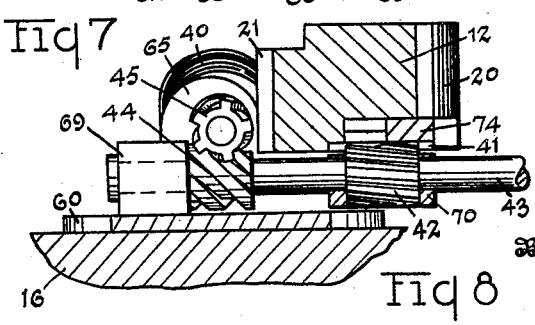
Fig 7
Fig 8
Inventor
Carl W. Herzog
By Faust & Crampton
Attorney Patented Apr. 8, 1930

1,753,784

UNITED STATES PATENT OFFICE

CARL W. HERZOG, OF TOLEDO, OHIO

TRANSMISSION GEAR

Application filed October 7, 1929. Serial No. 397,851.

My invention has for its object to provide a uniformly progressive, variable speed, positive transmission mechanism. The invention particularly provides a means wherein the transmission is produced through parts that are so interconnected that all slippage is eliminated. The invention is of especial value when used in structures that require refined differentiation of speeds to obtain exact desirable speeds in parts of the mechanism.

The invention may be contained in structures of different forms which vary in their details and, to illustrate a practical application of the invention, I have selected a structure containing the invention as an example of the various embodiments of my invention and shall describe the structure hereinafter. The particular structure selected is shown in the accompanying drawings.

Figure 9:
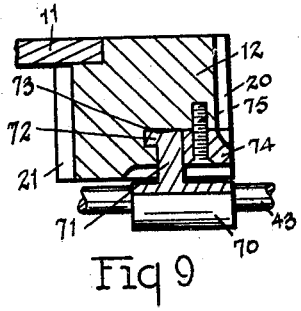
Figure 11:
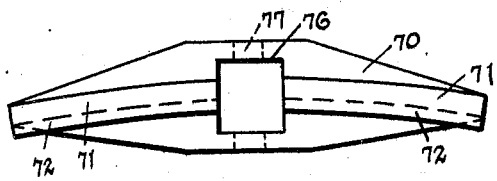
Figure 12:
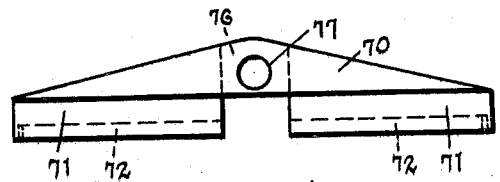
Figure 10:
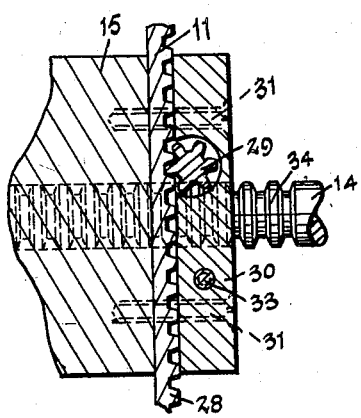
Figure 13:
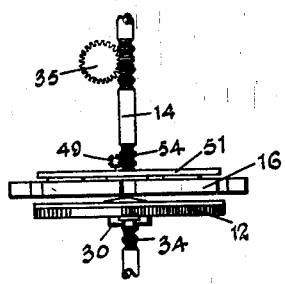

Fig. 1 is a view of the mechanism selected and illustrates the drive connections. Fig. 2 is a front view of the mechanism. Fig. 3 is an edge view of the mechanism. Fig. 4 is a rear view of the mechanism. Fig. 5 is a view of a section taken on the plane of the line 5—5 indicated in Fig. 3. Fig. 6 is a view of a section taken on the plane of the line 6—6 indicated in Fig. 3. Fig. 7 is a view of a section taken on the plane of the line 7—7 indicated in Fig. 5. Fig. 8 is a view of a section taken on the plane of the line 8—8 indicated in Fig. 5. Fig. 9 is a view of a section taken on the plane of the line 9—9 indicated in Fig. 5. Fig. 10 is a view of a section taken on the plane of the line 10—10 indicated in Fig. 6. Fig. 11 is a top view of a gear block. Fig. 12 illustrates a side view of the gear block shown in Fig. 11. Fig. 13 is a top view of the mechanism and shows a means for regulating the speed transmitted.

In the particular form of construction shown in the drawings, a rotatable driving element is supported for rotation about an adjustable center and for rotation about its own axis. In rotating about an axis exterior to its own axis, it rotates the supporting member or the driven member of the mechanism. By varying the distance between the parallel axes about which the driving element produces its planetary movement, a corresponding variation in the speed of rotation is produced in the driven member. In the form of construction shown, a driving pinion 1 is connected to a flexible shaft 2 that may be, if desired, provided with two universal joints 3 and 4. The shaft 2 may be driven by any suitable power, such as the motor 5. The pinion 1 is rotatably supported in a bracket 10 that is connected to a rotatable plate 11. The plate 11 is slidably and co-axially supported with the ring gear 12. The plate 11 is provided with a slot 13 through which extends a shaft 14. The shaft 14 is connected to a hub 15 that is rotatably supported in a fixed plate 16. The plate 16 may be secured to a supporting base, such as by the brackets or legs 17. The ring gear 12 has a recess in which the plate 11 is slidably mounted and secured by the lugs 18.

The ring gear 12 is provided with the external gear teeth 20, that mesh with the pinion 1, and the internal gear teeth 21 that engage with relatively fixed members for preventing slippage of the ring gear. When, therefore, the pinion 1 is rotated, the pinion will follow the gear wheel 12 and move over the teeth 20 and cause rotation of the pinion 1 about the axis of the shaft 14.

The shaft 14 extends through the hub 15, the plate 11 to which the pinion 1 is rotatably connected and the gear wheel 12. The hub 15 has an oblong projection 25 that fits the slot 13. Consequently, movement of the pinion 1 over the gear wheel 12 causes rotation of the plate 11 about the axis of the shaft 14 and also causes the rotation of the hub 15. The hub 15 is slip-keyed to the shaft 14 by means of the key 26 which extends into the slot 27 formed in the hub 15 with the result that rotation of the hub 15 will rotate the shaft 14 and the speed of the rotation of the shaft 14 will be considerably less than the speed of rotation of the pinion 1. The rotation of the revolutions per minute will depend upon the distance between the axes of the pinion 1 and the shaft 14.

The relative positions of the pinion 1 to the axis of the shaft 14 are obtained by the adjustment of the plate 11 relative to the shaft.

The plate 11 is provided with a rack 28 and a pinion 29 is rotatably connected to the hub 15. The pinion 29 is imbedded in the plate 30 which is secured to the hub 15 by means of the screws 31. The pinion 29 is inserted in a recess formed in the plate 30 and an outer bearing block 32 is secured to the end edge of the plate 30 by means of the screw 33. The pinion 29 operates to shift the plate 11 relative to the shaft 14 by rotation of the pinion which operates upon the rack 28. The pinion 29 may be rotated by shifting the shaft 14 which is provided with a rack 34. Consequently, by movement of the shaft 14, the location of the plate 11 and the ring gear 12 will be shifted relative to the shaft 14. Any suitable means may be provided for shifting the shaft 14 relative to the hub 15, such as the pinion 35.

In order to secure the plate 11, and the ring gear 12 in its adjusted relation to the shaft 14, notwithstanding the rotation of the plate and the ring gear, a plurality of members are located on the fixed plate 16 that have surfaces that limit the inner movement of the ring gear and the plate to points such that the axis of the pinion 1 will maintain its parallel relation to the axis of the shaft 14 and a constant distance therefrom as it moves over the ring gear 12. Also, the members are provided with engaging parts that prevent the ring gear slipping circularly by reason of the traction of the pinion which would otherwise cause the ring gear to move circularly in a direction opposite to that which it is intended to cause the pinion to rotate around the axis of the shaft 14. Thus, the plurality of members not only maintain the axis of the pinion at the constant adjusted distance from the axis of the shaft 14, but also prevent slippage as between the driving and driven member.

The inwardly extending teeth 21 of the ring gear engage a plurality of spiral or worm gears 40 which are rotatably supported upon the fixed plate 16 and are located so that as the pinion 1 moves around the ring gear, the pinion will cause the teeth 21 to mesh with the spiral gears 40 in succession. In order to maintain the spiral gear in such relation to the worm gears that, notwithstanding the movement of the ring gear, the teeth 21 will mesh with the spiral teeth of the worm gears, the ring gear is provided with teeth 41 that mesh with the pinions 42 that are slip-keyed on the rods 43. Rotation of the pinions 42 and the rods 43 rotates the worm gear wheels 44 located on the ends of the rods 43. The worm gear wheels 44 mesh with the worm gear wheels 45 that are connected to the spiral gear wheels 40. Thus, as the ring gear 12 creeps in a direction that the pinion 1 is moved about the axis of the shaft 14, the teeth 21 will mesh with the teeth of the worm gears 40 in succession and thus prevent slippage in the opposite direction by reason of the traction of the pinion 1.

In order to provide adjustment of the worm gears 40, according to the adjustment of the plate 11, to the shaft 14, the shaft 14 operates through the pinion 49 to rotate a shaft 50 that is supported upon the plate 51. The shaft 50 is provided with the pinion 52 that meshes with an arcuate rack 53 located on the fixed plate 16 which will cause rotation of the plate 51 as well as movement of the pinion 49 about the axis of the shaft 14. Consequently, the shaft 14 has teeth 54, formed bead like in the surface of the shaft, to maintain its engagement with the pinion 49 notwithstanding the rotation of the pinion 49 relative to the shaft 14, and also notwithstanding the rotation of the shaft 14 by the movement of the plate 11 and the ring gear 12, relative to the pinion 49. The plate 51 is provided with a plurality of slots 55 that are, preferably, arcuate in form and are inclined to the radius of their centers. The gears 40 have supporting members that are shifted radially with respect to the shaft 14 by means of the slots 55.

The worm gears 40 and the shafts 43 are supported upon the plate 16 by means of the spools 60. The spools 60 are provided with a pair of end plates 61 and 62 that are connected together by a shank 63. The shanks 63 of the spools 60 are located in the radial slots 64 and the plates 61 and 62 are located on opposite sides of the fixed plate 16. The spiral gears 40 are rotatably supported in the frames 65 that are secured to the spools 60 by means of the bolts 66 and the pins 67. The rod 43, associated with each spiral gear 40, is rotatably supported in a bearing 69 that forms a part of the frame 65 and is also rotatably supported in a bridge 70 that is connected to the ring gear 12. The bridge 70 has a flange 71 that is provided with a ledge 72, and the ring gear 12 is provided with a channel 73 in which the ledge 72 is located. An auxiliary gear 74 is secured to the ring gear 12 to secure the flange 71 in its connected and slidable relation to the ring gear 12. The auxiliary ring gear 74 may be secured by the screws 75 to the ring gear 12. The bridge 70 is provided with an opening 76 in which the associated pinion 42 may be located. The parts of the bridge 70, located on opposite sides of the openings 76, for containing the pinion 42, may be provided with openings 77 through which the shaft 43 extends. Thus the shaft 43 will be supported by the bearing block 69 at one end, and the bridge 70 at the other end, and the pinion 49 will be moved along the shaft 43 by the ring gear 12 as it moves to and from the worm gears 40 as the pinion 1 is rotated about the axis of the shaft 14. By reason of the maintenance of a distance less than the radius of the ring gear between the shaft 14 and the pinion 1, the ring gear 12 is moved to and from the worm gears. The position of the worm gears and, consequently, of the mechanism associated with the worm gears 40, is determined by the position of the slots 55 which operate upon the pins 80 that are connected to the shanks 63 of the spools 60. When, therefore, the plate 51 is moved, the pins 80 are shifted radially along the slots 64 to vary the distances between the parallel axes of the pinion 1 and the shaft 14.

The variation in the relative location of the axis of the pinion to the axis of the shaft produces variation in the revolutions per minute of the hub 15 and the shaft 14, since the ring gear 12 creeps in the direction of rotation of the pinion about the axis of the shaft. The reduction produced is substantially the same as the ratio of diameters of the pinion to the diameter of the circular path described by the pinion.

The change in reduction can be made without disconnecting the transmission either from the driving or the driven means which is very desirable in many cases. The change is accomplished, in the particular form of construction shown, by changing the radial distances of the engaging surfaces of the spiral gears 40 which are maintained in gear engaging relation with the ring gear 12 by the pinions 42.

If desired, the driven device may be connected to the hub 15 as by means of the gear wheel 85, instead of with the shaft 14. The shaft may then be only used for changing or controlling the transmission gear.

I claim:

1. In a speed transmission gear, a floating circular member, means for varying the effective radius of the circular member, an element movable over the circular member, and a rotatable element connected to the member and driven by the member according to the speed of rotation about the effective radiant center of the circular member.

2. In a speed transmission gear, a tooth gear member having a rotatable center, a pinion rotatable on and about the tooth gear member, means for varying the radius of rotation of the center of the member, and means for preventing movement of the tooth gear member in a direction opposite to that in which the pinion moves about the tooth gear member.

3. In a speed transmission mechanism, a tooth gear member having a rotatable center, a pinion, means for rotating the pinion about its own center and about the tooth gear member, a member slidably connected to the tooth gear member and rotated by rotation of the pinion about the tooth gear member.

4. In a speed transmission mechanism, a tooth gear member having a rotatable center, a pinion, means for rotating the pinion about its own center and about the tooth gear member, a member slidably connected to the tooth gear member and rotated by rotation of the pinion about the tooth gear member, a shaft connected to the last named member and located in the center of rotation of the center of the tooth gear member.

5. In a speed transmission mechanism, a tooth gear member having a rotatable center, a pinion, means for rotating the pinion about its own center and about the tooth gear member, a member slidably connected to the tooth gear member and rotated by rotation of the pinion about the tooth gear member, a shaft connected to the last named member and located in the center of rotation of the center of the tooth gear member, and means for adjusting the tooth gear member relative to the shaft to vary the radius of rotation of the center of the tooth gear member.

6. In a speed transmission mechanism, a tooth gear member having a rotatable center, a pinion movable over the tooth gear member and about the tooth gear member, a plurality of locking members for engaging the tooth gear member for preventing movements of the tooth gear member in a direction opposite to the movement of the pinion about the tooth gear member, the said locking members located radially with respect to the center of rotation of the center of the tooth gear member.

7. In a speed transmission mechanism, a tooth gear member having a rotatable center, a pinion movable over the tooth gear member and about the tooth gear member, a plurality of locking members for engaging the tooth gear member for preventing movements of the tooth gear member in a direction opposite to the movement of the pinion about the tooth gear member, the said locking members located radially with respect to the center of rotation of the center of the tooth gear member, and means for varying the radial distances between the locking members and the center of rotation of the center of the tooth gear member.

8. In a speed transmission mechanism, a tooth gear member having a rotatable center, a pinion, means for rotating the pinion to cause its movement about the gear member, a plurality of gears for engaging the gear member and located radially about the center of rotation of the center of the gear member.

9. In a speed transmission mechanism, a tooth gear member having a rotatable center, a pinion, means for rotating the pinion to cause its movement about the gear member, a plurality of gears for engaging the gear member and located radially about the center of rotation of the center of the gear member, and means for varying the radial distances of the gears from the center of rotation of the center of the gear member.

10. In a speed transmission mechanism, a tooth gear member having a rotatable center, a pinion, means for rotating the pinion to cause its movement about the gear member, a plurality of gears for engaging the gear member and located radially about the center of rotation of the center of the gear member, the gear member adapted to mesh with the said gears in succession.

11. In a speed transmission mechanism, a tooth gear member having a rotatable center, a pinion, means for rotating the pinion to cause its movement about the gear member, a plurality of gears for engaging the gear member and located radially about the center of rotation of the center of the gear member, and means connected to the gear member for maintaining the gears in position to mesh with the gear member in succession.

12. In a speed transmission mechanism, a tooth gear member having a rotatable center, a pinion, means for rotating the pinion to cause its movement about the gear member, a plurality of gears for engaging the gear member and located radially about the center of rotation of the center of the gear member, means connected to the gear member for maintaining the gears in position to mesh with the gear member in succession, and means for adjusting the radial distance between the gears and the center of rotation of the center of the gear member.

13. In a speed transmission mechanism, a tooth gear member having a rotatable center, a pinion, means for rotating the pinion to cause its movement about the gear member, a plurality of gears for engaging the gear member and located radially about the center of rotation of the center of the gear member, the gear member adapted to mesh with the said gears in succession, and means for adjusting the radial distance between the gears and the center of rotation of the center of the gear member.

14. In a transmission mechanism, a rotatable circular member, a driving element for engaging a peripherial portion of the circular member and movable along the peripherial portion of the circular member in one direction, and means for varying the diameter of movement of the center of the circular member.

In witness whereof I have hereunto signed my name to this specification.

CARL W. HERZOG.